Patented July 23, 1935

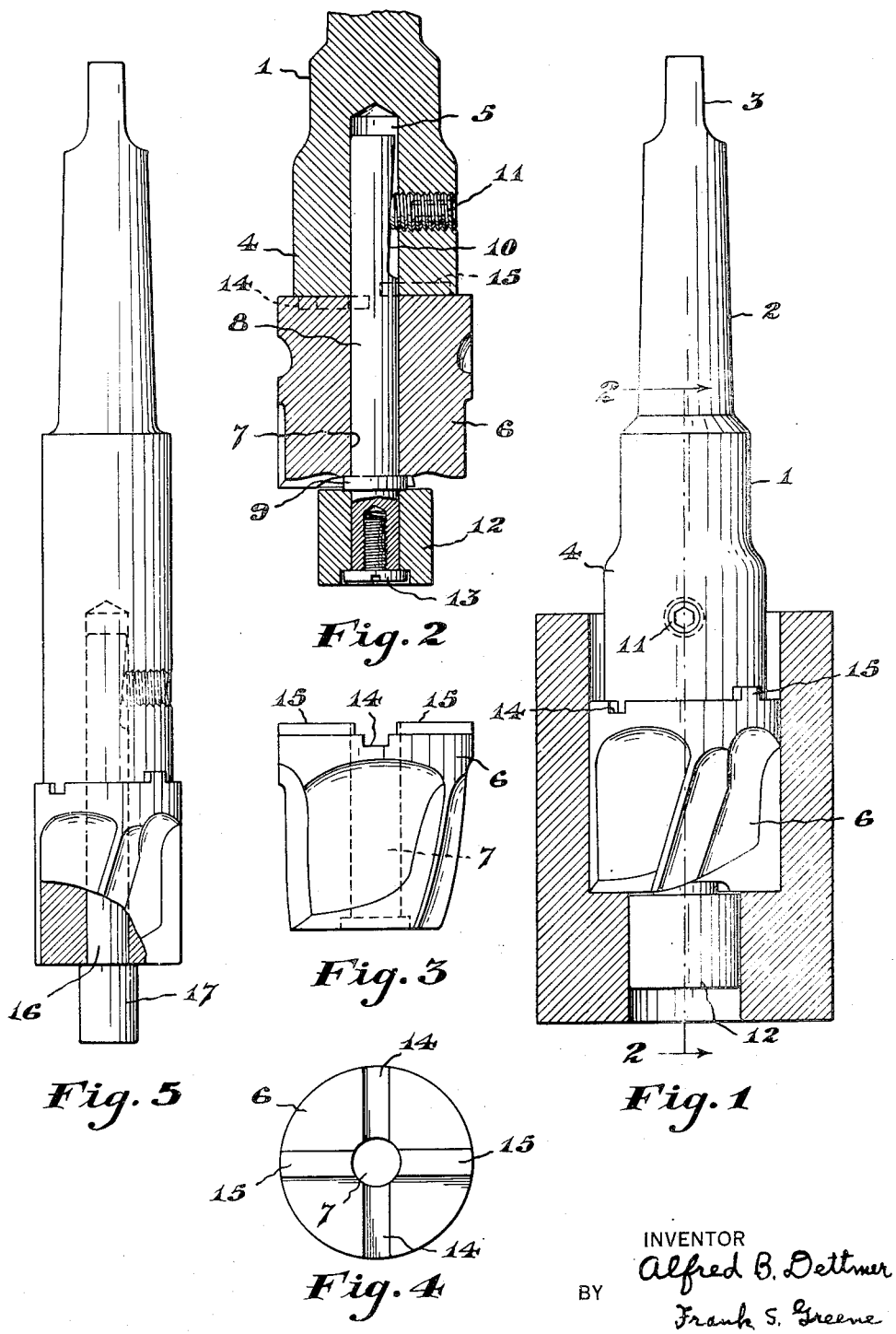

2,009,168

UNITED STATES PATENT OFFICE 2,009,168

TOOL FOR COUNTERBORING OR SPOT FACING

Alfred B. Dettmer, Rocky River, Ohio, assignor to The National Tool Company, Cleveland, Ohio, a corporation of Ohio Application July 23, 1930, Serial No. 469,983

2 Claims. (Cl. 77—58)

The present invention relates to cutting tools of the type known as counterbores and spot facers which are employed for cutting counterbores or for milling the surface around the margin of a bore to provide a flat seat either at the face of the work or at the bottom of a counterbore.

The present invention has for an object to provide a cutter which is so constructed and connected to its shank that the cutter is rigidly held against relative lateral or angular movements with respect to the shank and further to provide means of attachment such that the cutter can be quickly and easily attached to its shank or detached therefrom.

A further object is to provide a cutting tool in which the cutter is secured to a shank by means of a pilot pin and in which a rigid driving and centering connection between the cutter and shank is provided independently of the pilot pin by interengaging ribs and grooves formed in the contiguous end faces of the cutter and shank.

A further object is to provide the cutter and shank with end faces having interfitting grooves and ribs which are so disposed on said end faces that the faces may be readily machined and which are also so disposed that cutters of various diameters will interfit with the same shank.

With the above and other objects in view, the invention may be said to comprise the cutting tool, as illustrated in the accompanying drawing hereinafter described and particularly set forth in the appended claims, together with such variations and modifications thereof as will be apparent to one skilled in the art to which the invention appertains.

Reference should be had to the accompanying drawing forming a part of this specification in which:

Figure 1 is a side elevation of a cutting tool embodying the invention.

Fig. 2 is an axial section taken on the line indicated at 2—2 in Fig. 1.

Fig. 3 is a side elevation of the cutter.

Fig. 4 is a top plan view of the cutter.

Fig. 5 is a side elevation showing a slightly modified form of cutting tool.

As shown in the accompanying drawing, the tool of the present invention has a shank 1 provided with a tapered inner end portion 2 terminating in a flattened end 3 to fit in the tapered socket of a spindle chuck and provide a driving connection with the spindle in which the shank is mounted.

At its outer end, the shank is provided with an enlarged head 4 in which there is formed an axial bore 5. Upon the end of the head 4, there is secured the cutter 6 through which there is an axial bore 7 adapted to register with the bore 5 of the shank. The cutter is held in place on the shank by means of a pilot pin 8 which fits in the bores 5 and 7 of the shank and cutter and which has an integral flange 9 spaced inwardly from its outer end which engages with the outer end of the cutter. The pilot pin 8 has a flat side face 10 formed on the inner end portion thereof which fits within the bore 5 of the shank and this face is preferably at an inclination to the axis of the pin, tapering inwardly from the inner end of the pin and is engaged by a radial set screw 11 which is threaded in the head 4. The screw 11 is adapted to be turned by means of a suitable tool to force the inner end of the screw into tight engagement with the face 10 of the pilot pin or to move the screw outwardly clear of the bore 5 to permit removal of the pilot pin.

A roller 12 is journaled on the outer end of the pilot pin outwardly of the flange 9 and is held in place by means of a screw 13 threaded into the end of the pilot pin. In order to rigidly hold the cutter against relative angular or lateral movements with respect to the shank, the contiguous faces of the shank and cutter are provided with interfitting ribs and grooves which are so disposed as to rigidly lock the cutter and shank against relative angular and lateral movements.

The end faces of the cutter and shank are preferably of identical form and each is provided with a diametrical groove 14 and a diametrical projecting rib 15 disposed at right angles to the groove. The rib of the shank fits in the groove of the cutter and the rib of the cutter fits in the groove of the shank. By forming interfitting ribs and grooves which are angularly disposed, a rigid interlock is provided between the cutter and shank which rigidly holds the cutter against relative lateral or angular movements with respect to the shank and by forming a projecting rib and a groove disposed angularly with respect to the rib on each of the two end faces. The end faces can be quickly and easily machined, since each of the surfaces may be formed by a milling cutter or grinding wheel moving across the end face.

Furthermore, with crossing grooves and ribs such as herein shown, cutters of various diameters may be secured upon the same shank. The roller 12 which must be of a diameter to fit in the bore to be faced or counterbored, may be quickly and easily detached by removing the screw 13 and replaced with a roller of a different diameter. Rollers and cutters may be provided for as many different diameter of bores and counterbores as desired and the tool can be readily assembled for use with a bore of any diameter to form or square the bottom of a counterbore of any diameter.

In Fig. 5 of the drawing, there is shown a slightly modified form of the invention which differs from the form shown in Figs. 1 to 4 only in that a slightly different form of pilot pin is employed.

In this modification, the pilot pin 16 is provided with an integral cylindrical head 17 which serves to hold the cutter to the shank and which is of a diameter to fit in the bore to be counterbored or faced.

It will be apparent that the present invention provides a counterbore or spot facer in which the cutter can be quickly and easily removed from its shank and replaced with another cutter and that if desired, this may be done without removing the shank from its chuck, proper centering of the cutter and a rigid driving connection between the shank and cutter being insured by the interfitting ribs and grooves.

What I claim is:

1. A device of the character described comprising a shank having a relatively small axial bore at its outer end, and an end face provided with a diametrical rib, a diametrical groove at right angles to the rib and flat face portions intermediate the rib and groove lying in a plane perpendicular to the axis, a cutter having teeth at its outer end and a cylindrical inner end, said cutter having an inner end face complemental to the end face of the shank which has a rib which fits in the groove in the shank face, a groove which receives the rib of the shank face and intermediate flat portions which engage the flat portions of the shank face, said cutter having a relatively small axial bore alined with the bore of the shank, a pilot pin fitting in said bores, means for releasably securing the pin in the shank, and means on the pin for holding the cutter against the shank.

2. A device of the character described comprising a shank having a relatively small axial bore at its outer end, and an end face provided with radially elongated ribs extending from opposite sides of the bore to the outer periphery, radially elongated grooves disposed at an angle to the ribs and extending from the bore to the periphery and flat face portions intermediate the ribs and grooves lying in a plane perpendicular to the axis, a cutter having an inner end face complemental to the end face of the shank and having ribs which fit in the grooves of the shank, grooves which receive the ribs of the shank and intermediate flat portions which engage the flat portions of the shank face, said cutter having an axial bore which registers with the bore of the shank, a pilot pin fitting in said bores, means for releasably securing the pin in the shank, and means on the pin for holding the cutter against the shank.

ALFRED B. DETTMER.